3,461,545
METHOD FOR FASTENING METAL PARTS TO THERMOPLASTIC OBJECTS
George F. Bush, Detroit, Mich., assignor to Ford Motor Company, Dearborn, Mich., a corporation of Delaware
Filed Apr. 17, 1967, Ser. No. 631,387
Int. Cl. B21d 39/00; B23p 11/00
U.S. Cl. 29—509                    3 Claims

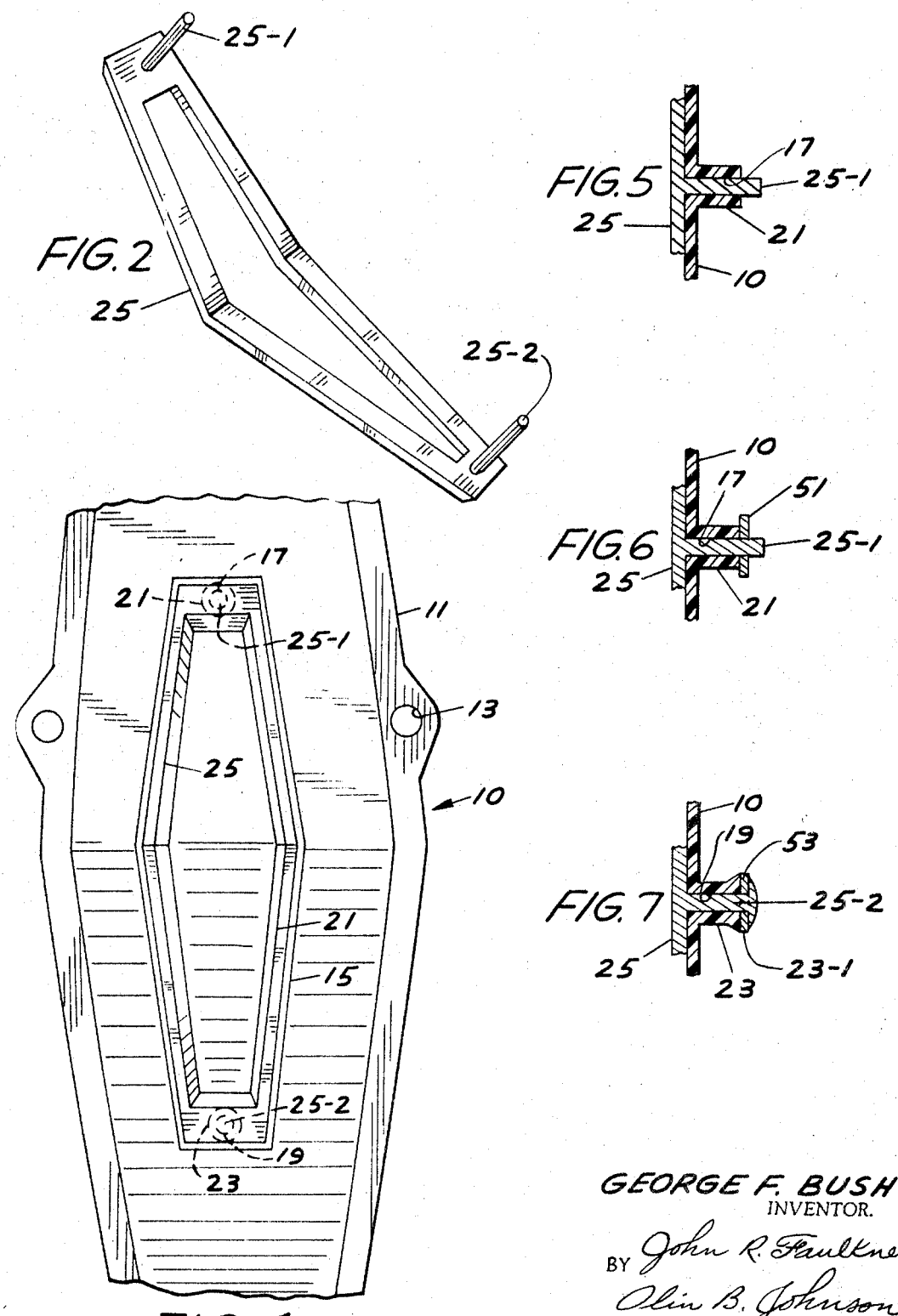
Aug. 19, 1969 G. F. BUSH 3,461,545
METHOD FOR FASTENING METAL PARTS TO
THERMOPLASTIC OBJECTS
Filed April 17, 1967 2 Sheets-Sheet 1
GEORGE F. BUSH
INVENTOR.
BY John R. Faulkner
Olin B. Johnson
ATTORNEYS Aug. 19, 1969  G. F. BUSH  3,461,545
METHOD FOR FASTENING METAL PARTS TO
THERMOPLASTIC OBJECTS
Filed April 17, 1967  2 Sheets-Sheet 2
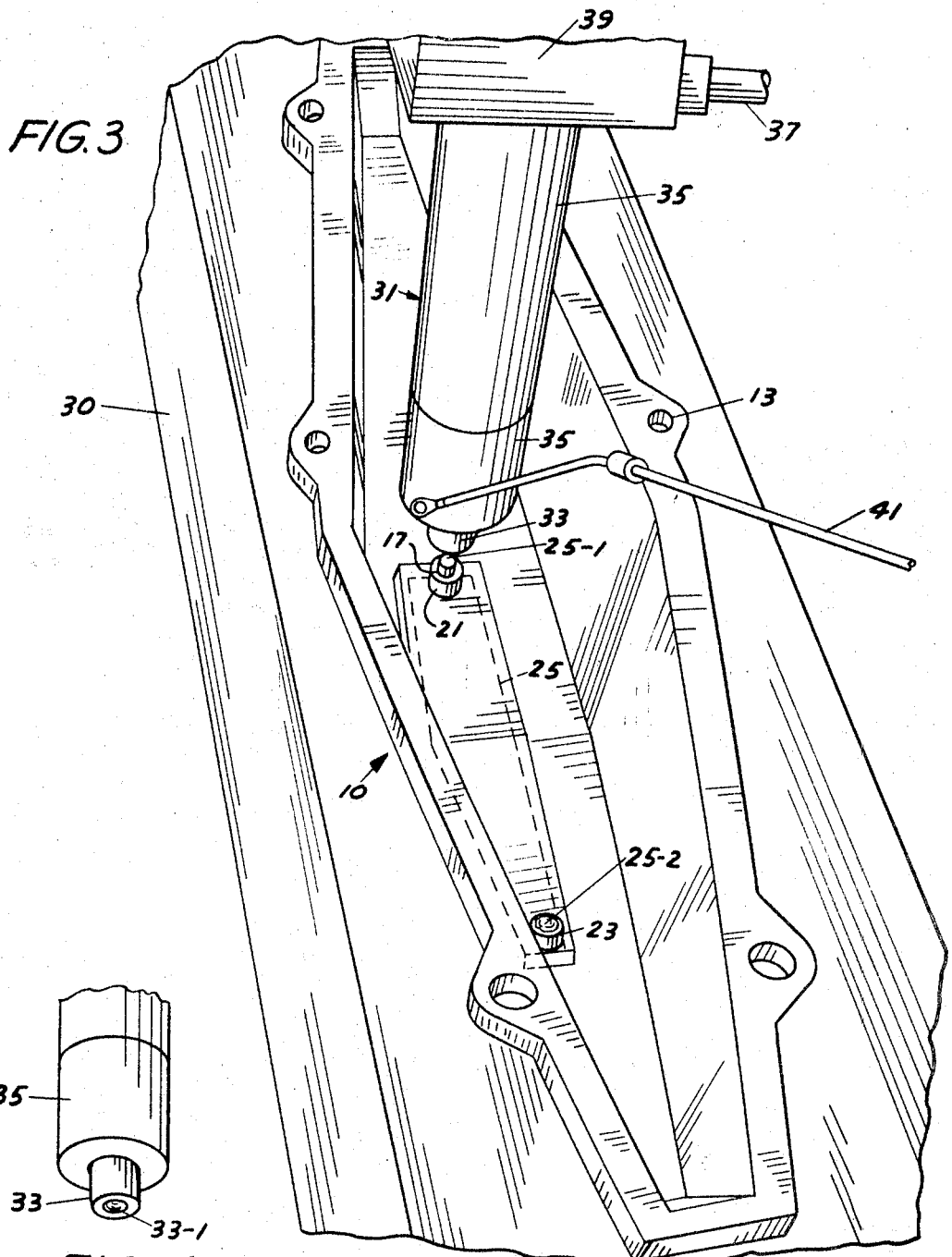
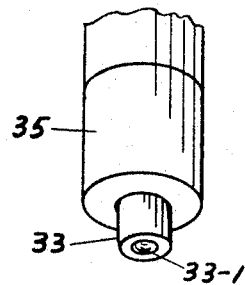
GEORGE F. BUSH
INVENTOR.
BY John R. Faulkner
Olin B. Johnson
ATTORNEYS United States Patent Office 3,461,545
Patented Aug. 19, 1969

ABSTRACT OF THE DISCLOSURE

A method for fastening a metal part having a projecting stud to a thermoplastic object having a boss thereon with an aperture therethrough which comprises inserting said stud through said aperture and simultaneously upsetting the inserted end of said stud, melting a portion of the thermoplastic boss encompassing said aperture, and sealing said stud and said thermoplastic object in watertight relationship.

---

This invention relates to a method for attaching metal ornamentation to thermoplastic objects and simultaneously effecting a sealed relationship therebetween. In particular, this invention is concerned with fastening metal ornaments to thermoplastic components of automative vehicles and other articles of manufacture.

The method of this invention is herein illustrated and described with reference to attaching metal ornamentation to thermoplastic tail lamp lens. Such ornaments as a rule are die cast of a zinc alloy and subsequently nickel chromium plated for improved appearance.

Current methods for attaching ornamentation to thermoplastic components on automotive vehicles generally include cementing, mechanical fastening devices, and heat staking.

Cementing is commonly employed to attach metal to automotive tail lamp lens. For example, the thermoplastic lens, conventionally injection molded from an acrylic type plastic, may have on its surface a tongue configuration to accept the grooved side of a metal stamping. Either a two-part polymerizable adhesive or a one-part solvent type adhesive is applied to the grooved side of the stamped ornament. The adhesive bearing ornament is then put into place over the lens by hand. Several hours are usually required for the adhesive to acquire full bond strength.

Mechanical fastening, as the name implies, employs threaded studs and nuts or clips or similar devices which are ordinarily hand applied with the use of a suitable tool. Despite the fact that this method is in extensive use in tail lamp assembly, it has many disadvantages. Since a hermetic seal is required to protect against corrosion of the light bulb terminals and to prevent formation of water condensate inside the compartment formed by the mounted lens, a rubber grommet and mastic sealant are used at the attachment holes. This adds to the time and cost of assembly and frequently is ineffective as a result of either human error or mechanical failure.

In the method that has become known in the art as "heat staking," fastening is accomplished by imbedding some part of the ornament into the parent plastic by means of heat. In this method, heat is commonly conducted from a heated tool to the face of the ornament and through the stud to melt the plastic with which the stud is in contact. With the end of the stud previously upset into a mushroom-like head, the end of the stud is entrapped within the plastic when the source of heat is removed. The time required to conduct the required heat throughout the length of the stud at temperatures which will neither damage the plated surface nor detrimentally affect the adjacent plastic is objectionably long where rapid assembly is required. Staking may also be accomplished by applying high frequency vibrational energy to the ornament to create frictional heat at the stud heads and melt the adjacent plastic. When the ornament requires a large number of studs, this method becomes impractical for large scale assembly.

It is the object of this invention to provide a rapid and effective method for simultaneously upsetting ornament studs protruding through apertures in the thermoplastic part and sealing the plastic to the stud between the upset portion of the stud and the ornament bearing such stud.

This invention will be more fully understood from the following detailed description when read in conjunction with the accompanying drawings wherein:

FIGURE 1 is a partial view in elevation of the outer surface of an automobile tail lamp lens with metal ornament attached;

FIGURE 2 is a perspective view of the metal ornament of FIGURE 1 and the two mounting studs integral therewith;

FIGURE 3 is a perspective view of the opposite side of the lens of FIGURE 1 showing one stud of the ornament upset and sealed, the second stud positioned for upsetting and sealing, and heat and pressure means moving into position for upsetting and sealing the second stud;

FIGURE 4 is a perspective view of the end of the heat and pressure means showing the concave nature of the working face thereof;

FIGURE 5 is a partial, sectional view bisecting the unworked stud immediately after insertion of the ornament through the aperture in the lens and the boss thereon;

FIGURE 6 is the same view shown in FIGURE 5 with the stud also inserted through a lock washer which rests upon the bos of the lens; and FIGURE 7 is a partial sectional view bisecting the upset stud shown in FIGURE 3.

Referring now to the drawings, there is shown a tail lamp lens 10 of a type commonly used on automotive vehicles. Lens 10 may be any injection molded thermoplastic material of suitable color, degree of transparency, and other optical properties requisite for the intended use. In this embodiment, lens 10 has a peripheral flange 11 with a plurality of flange apertures 13 therein for use in mounting the lens upon an automotive vehicle, and a centrally positioned depression 15 upon the outer surface, a pair of apertures 17 and 19 positioned at opposite ends of depression 15 which extend through the lens proper and through the bosses 21 and 23 which extend from the inner surface of lens 10. Positioned within depression 15 is a metal ornament 25 having a pair of projecting studs 25–1 and 25–2. Ornament 25 is shown separately in FIGURE 2. Ornament 25 may be any metal or alloy having appropriate strength in relation to size for the intended use that is readily deformable at temperatures in the range of about 500° to 1000° F. In this embodiment, ornament 25 is a die cast alloy having the following composition:

|    | Wt. percent |
|----|---:|
| Al | 3.5–4.3 |
| Cu | 0.75–1.25 |
| Mg | 0.03–0.08 |
| Fe | 0.10 |
| Pb | 0.007 |
| Cd | 0.005 |
| Sn | 0.005 |
| Zn | balance |

Referring now particularly to FIGURE 3, the lens 10 is shown seated in a female die 30 with ornament 25 in the position it assumes in the completed article with studs 25–1 and 25–2 extending through apertures 17 and 19 respectively which extend through the body of the lens and through cylindrical bosses 21 and 23. In this embodiment, apertures 17 and 19 each have a diameter of about 0.135 inch. Studs 25–1 and 25–2 prior to upsetting are just sufficiently smaller in diameter to slip easily through apertures 17 and 19 and here measure about 0.40 inch in length. Positioned in front of stud 25–1 is a staking tool 31. Projecting from the front of staking tool 31 is a heated punch or ram 33 which preferably has a concave frontal or working surface 33–1 shown in FIGURE 4. In this embodiment, ram 33 is supported within housing 35 and heated to a temperature of about 850° F. by conventional electrical resistance heating means within said housing. Such heating means is in electrical connection with and receives electrical energy from an electrical power source, not shown, via conductor-containing conduit 37. A portion of conduit 37 is shown extending from housing support 39. In practice it is advisable to have a voltage regulator in series with the power input conductor which passes through conduit 37 for controlling the temperature of the ram. A temperature monitoring means for monitoring the temperature of the ram 33 is employed in this embodiment and is here indicated by conductor 41 which is in electrical connection with an iron-constantan thermocouple embedded in the ram and at the opposite end with a potentiometer. It will be understood by those skilled in the art that the temperature monitoring means and the voltage regulator in series with the power input may be interconnected to provide automatic adjustment and control of the ram temperature.

Staking tool 31 and ram 33 are reciprocally movable in the direction of and away from stud 25–1. Staking tool 31 may be manually operated or programmed to automatically move ram 33 against the projecting tip of stud 25–1 with a predetermined force for a predetermined time when stud 25–1 is positioned as shown in FIGURE 3.

The positioning and configuration of stud 25–1 prior to contact with ram 33 is more clearly shown in FIGURE 5. In the preferred embodiment, shown in FIGURE 6, a metal washer 51 is slipped over the end of stud 25–1 to rest against boss 21 prior to upsetting the stud. Washer 51 is preferably a lock washer having a knurled or otherwise uneven surface that readily penetrates the plastic boss 21 when the latter is heated and washer 51 is pushed against the heated boss in the course of upsetting stud 25–1.

In operation, the heated ram 33 is pressed against the end of stud to be upset with a pressure sufficient to upset the end of the stud as shown in FIGURE 7. While the stud is being upset, the nearest portion of the boss through which the stud is projecting is melted and/or sufficiently softened to upset this portion of the boss so that upon cooling the thermoplastic material of the boss entraps the upset stud and closes the aperture through which the stud is inserted by providing a circumferential seal about the stud.

The completed fastening is illustrated with upset stud 25–2 in FIGURE 3 and more clearly shown in FIGURE 7. Referring now to FIGURE 7, a metal block lock washer 53 is shown between the upset end of stud 25–2 and the upset portion of boss 23. It will be noted that in this embodiment washer 53 has been forced against the upper surface of boss 23 until it is at least partially imbedded therein with the upset portion of boss 23 forming a substantially peripheral lip 23–1 that at least partially covers the sides of washer 53 and upon cooling adheres thereto forming a part of the water-tight seal about stud 23.

Employing the procedure and materials hereinbefore described, it was found that approximately two seconds were required to upset (mushroom) the end of the stud and boss as illustrated in FIGURE 7. The previously known method hereinbefore referred to as "heat staking" requires a heating time of approximately 25–35 seconds in essentially equivalent circumstances.

In addition to the time advantage provided in relation to cementing, heat staking and mechanical fastening, a superior seal is consistently obtained, excessive heating and metal damage characteristic of heat staking is avoided, and the shadows cast by the long studs required for mechanical fastening are materially reduced.

For purposes of illustration, the foregoing example has been described with a single ram used to upset a single stud and then moved on to another. It will be understood by those skilled in the art that a plurality of spaced apart, heated rams may be used to upset a plurality of studs simultaneously and in so doing balance the pressure against the lens during the upsetting and hence eliminate need for separate holding means which may otherwise be needed to keep the lens and ornament in position within the die 30. This also prevents undue stress being placed upon a previously sealed stud when another is separately upset.

It will be understood that modifications of the described embodiments can be made without departing from the scope of the invention as set forth in the appended claims.

I claim:

1. A method for fastening a metal part having a projecting lug to a first side of a thermoplastic object having a boss extending therefrom on the side opposite said first side and an aperture therethrough and through said boss and extending from said first side to said side opposite which comprises inserting said stud through said aperture with the tip thereof protruding from said second side, supporting said meal part against said first side and simultaneously upsetting said tip, melting and upsetting a portion of said boss encompassing said stud and sealing said aperture about said stud with the resultant upset portion of said boss by applying heat and pressure to the tip of said stud until said stud and said portion of said boss are upset and removing said heat and pressure.

2. The method of claim 1 wherein said thermoplastic object is an automobile tail lamp lens.

3. A method for fastening a metal part having a projecting lug to a first side of a thermoplastic object having a boss extending therefrom on the side opposite said first side and an aperture therethrough and through said boss and extending from said first side to said side opposite which comprises inserting said stud through said aperture with the tip thereof protruding from said second side, inserting said stud through a metal washer leaving said tip protruding therefrom, supporting said metal part against said first side and simultaneously upsetting said tip and forcing said washer against said boss until the upset portion thereof has a diameter in excess of the diameter of the opening of said washer, melting and upsetting a portion of said boss in contact with said washer and encompassing said stud and sealing said aperture about said stud with the resultant upset portion of said boss by applying heat and pressure to the tip of said stud until said stud and said portion of said boss are upset and removing said heat and pressure.

References Cited

UNITED STATES PATENTS

| | | |
|---|---|---|
| 820,586 | 5/1906 | Marshall. |
| 2,289,221 | 7/1942 | Sorensen. |
| 2,350,887 | 6/1944 | Goff. |
| 2,646,246 | 7/1953 | Tucci. |
| 2,782,392 | 2/1957 | Stolle. |
| 3,042,961 | 7/1962 | Tieri. |

CHARLIE T. MOON, Primary Examiner

U.S. Cl. X.R.

29—522, 527; 264—249; 287—189.36